United States Patent
Kurtz et al.

(10) Patent No.: US 8,442,744 B2
(45) Date of Patent: May 14, 2013

(54) COMPENSATION FOR OXYGENATED FUEL USE IN A DIESEL ENGINE

(75) Inventors: Eric Kurtz, Dearborn, MI (US); Douglas Glen Kuhel, Wolverine Lake, MI (US); Jianwen James Wi, Canton, MI (US); Christian Winge Viglid, Aldenhoven (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/839,674

(22) Filed: Jul. 20, 2010

(65) Prior Publication Data

US 2011/0162628 A1  Jul. 7, 2011

(51) Int. Cl.
*F02D 41/04* (2006.01)
*F02D 41/40* (2006.01)

(52) U.S. Cl.
USPC ........... 701/104; 701/105; 123/299; 123/672; 123/674; 123/676; 123/703

(58) Field of Classification Search ............ 123/1 A, 123/299, 672, 674, 676, 693, 703, 704; 701/105, 701/104
See application file for complete search history.

(56) References Cited

U.S. PATENT DOCUMENTS

| | | | |
|---|---|---|---|
| 4,036,186 A | 7/1977 | Hattori et al. | |
| 5,526,794 A | 6/1996 | Messih et al. | |
| 6,305,348 B1 * | 10/2001 | Grosmougin et al. | 123/299 |
| 7,027,906 B2 | 4/2006 | Araki | |
| 7,266,439 B2 | 9/2007 | Wang et al. | |
| 7,273,045 B2 | 9/2007 | Kurtz et al. | |
| 2004/0069281 A1 | 4/2004 | Corba | |
| 2008/0000450 A1 | 1/2008 | Serra et al. | |
| 2008/0097682 A1 | 4/2008 | Peron et al. | |
| 2008/0154480 A1 | 6/2008 | Banba et al. | |
| 2008/0308067 A1 | 12/2008 | Schuckert et al. | |
| 2009/0024303 A1 | 1/2009 | Schneider et al. | |
| 2009/0064976 A1 * | 3/2009 | Carr et al. | 123/674 |
| 2009/0105965 A1 | 4/2009 | Birk et al. | |
| 2009/0125153 A1 | 5/2009 | Yang et al. | |
| 2009/0281708 A1 * | 11/2009 | Loeffler et al. | 701/103 |
| 2009/0306879 A1 * | 12/2009 | Takubo | 701/104 |
| 2011/0132323 A1 | 6/2011 | Surnilla et al. | |

OTHER PUBLICATIONS

Harman, Alan, http://wardsauto.com/ar/cummins_purdue_nox_100222, Cummins, Purdue Partner to Reduce NOx Emissions in Biodiesel Engines, pp. 1-2, Feb. 22, 2010.

* cited by examiner

*Primary Examiner* — Erick Solis
(74) *Attorney, Agent, or Firm* — Julia Voutyras; Brooks Kushman P.C.

(57) ABSTRACT

To partially supplant the use of fossil fuels in diesel engines, oxygen-containing fuels, such as biodiesels, are proposed as blending agents in diesel fuel. Engine calibration coefficients to control EGR rate, timings and quantities of fuel injection pulses, turbocharger boost, etc, can be determined to compensate for the lower energy content of such oxygenate blends compared to diesel fuels. According to an embodiment of the disclosure, the fuel quantity of each of multiple injection pulses is increased proportionally to compensate for the impact of oxygenates. An adjustment in the fuel injection quantity is performed in response to a new tank of fuel and the adjustment is applied for that tank of fuel. A fuel compensation factor (FCF) can be determined based on the actual amount of fuel injected compared to the expected amount of diesel fuel at the present operating condition.

18 Claims, 6 Drawing Sheets

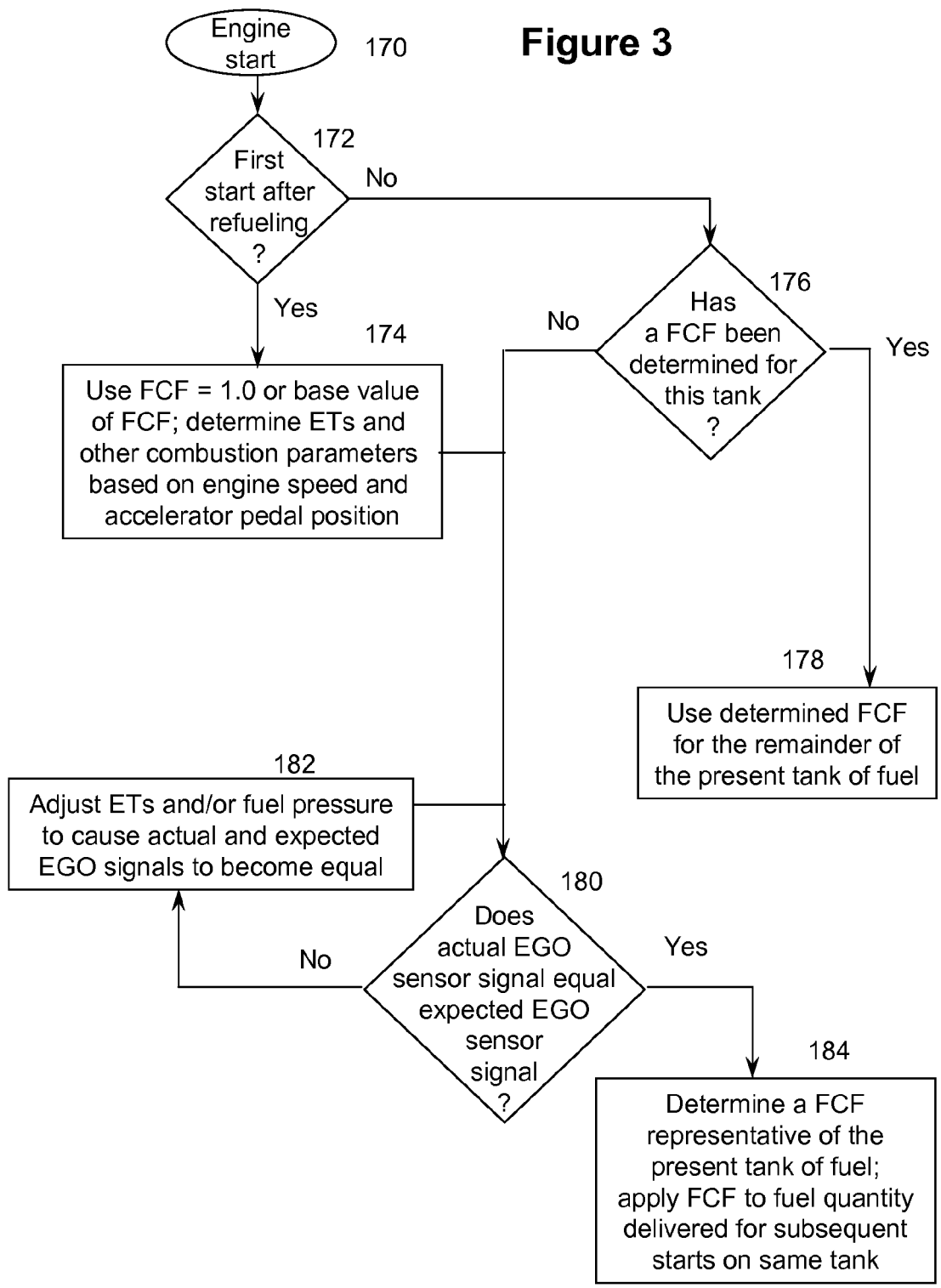

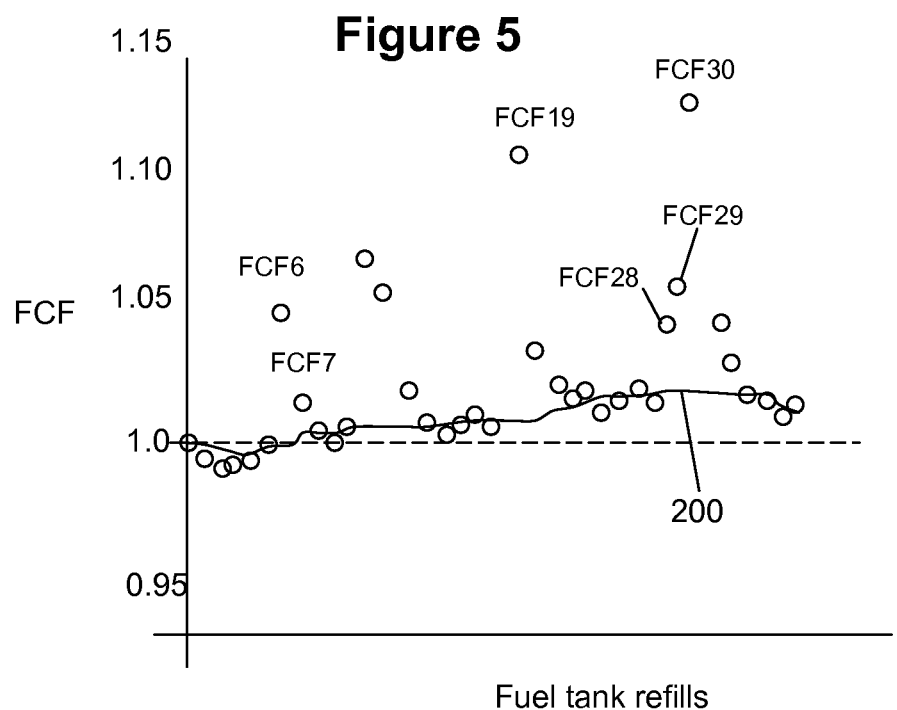
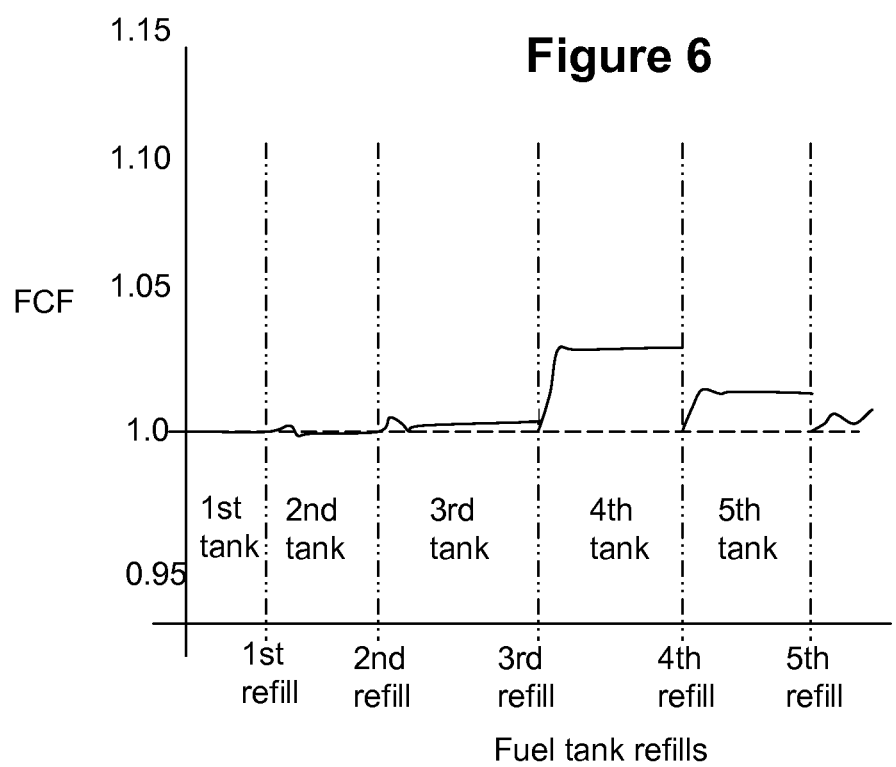

COMPENSATION FOR OXYGENATED FUEL USE IN A DIESEL ENGINE

BACKGROUND

1. Technical Field

The present disclosure relates to compensating for combusting oxygenated fuels in a diesel engine.

2. Background Art

Diesel engines are carefully calibrated to achieve mandated emission standards, but without substantially harming fuel economy and performance. To that end, exhaust gas recirculation (EGR), the number and timing of fuel injection pulses, turbocharger boost pressure, and other engine parameters are controlled to achieve the simultaneous goals. Such combination of control parameters is determined for standard diesel fuel. In the interest of supplanting fossil fuel usage, biodiesels and other alternative fuels are being developed and proposed as blending agents in diesel fuel. Many alternative fuels contain oxygen, i.e., oxygenated fuels. Some biodiesels are oxygenates, which are made by reacting oils, such as vegetable oil or animal fat, with an alcohol. One class of such biodiesels are fatty acid methyl esters (FAMEs), with canola-based, industrial-rapeseed-based, and soy-based FAMEs as examples. Other examples of oxygenates include alcohols and ethers. Oxygenates have a lower energy content than diesel fuel, the latter containing almost entirely hydrogen and carbon with only trace amounts of oxygen and other elements. When an oxygenate or oxygenate blend is directly substituted for diesel fuel at the same operating condition otherwise, the engine produces less power. The vehicle operator may compensate for the loss of power by requesting a higher level of power by depressing the accelerator pedal farther. However, not only does this cause the vehicle operator to sense a loss of power in the vehicle, but, the emissions and fuel economy suffer by relying on depressing the pedal farther to achieve the desired torque. In the absence of information that the fuel is an oxygenate, the engine's control system assumes that the pedal being actuated to a greater extent signifies that the torque level being requested is higher than what the operator actually desires. The EGR, turbocharger boost, number and timing of injections, and other engine parameters are being commanded based on the assumption that the driver is requesting a higher torque level and the fuel is diesel. When the fuel being supplied has a lower energy content than expected, the commanded engine parameters, based on the greater pedal actuation, are inappropriate for oxygenated fuel, which leads to increased emissions, reduced fuel economy, noisy combustion, and/or other undesirable consequences.

Furthermore, a diesel engine is typically calibrated to limit the total amount of fuel that can be injected into the engine to stay within physical design limits of the engine, i.e., to maintain peak pressure, turbine inlet temperature and/or turbine speed within component design limits. When an oxygenate or diesel/oxygenate blend is subjected to such limitation and the fuel injection pulses are not adjusted to account for the oxygen content in the fuel blend, the peak power from the engine is reduced, leading to customer dissatisfaction.

Another issue associated with using oxygenates arises due to their lesser range in volatility. Some exhaust aftertreatment devices operate more efficiently in a particular temperature range. Some exhaust aftertreatment devices require some unburned, or partially combusted, fuel for purposes of converting collected pollutants to unregulated components during a periodic regeneration process. According to some regeneration strategies, a post-injection fuel pulse is provided to cause late combustion to increase exhaust temperature and/or to provide hydrocarbons into the exhaust stream. As the post-injection pulse occurs late in the cycle when the piston is at a lower position, a significant fraction of the fuel sprays on cylinder walls and mixes with the oil on the cylinder walls. The piston rings then scrape the fuel and oil into the crankcase oil. Dilution of the oil by fuel negatively impacts the oil's ability to provide lubrication to the engine. In some cases, this leads to high oil levels causing oil to be pulled out of the crankcase and inducted into the engine, which can foul the intake and lead to unintended acceleration when combusted in the engine. Some engine controllers estimate oil dilution and at least partially base recommended oil change interval on the oil dilution level. The factors that can be used to estimate the amount of fuel in the oil include: the number, timing, and quantity of fuel injected in a post-injection pulse and the subsequent engine operating conditions. That is, in between events, such as regenerations of an aftertreatment device that calls for post-injections, some of the fuel in the oil vaporizes at engine operating conditions leading to elevated oil temperatures. Diesel fuel has a relatively wider range of volatility characteristics than oxygenates such that the lighter ends of the diesel fuel does vaporize. In contrast, oxygenates have a narrower range of volatility such that very little of the oxygenate is highly volatile so that very little of the oxygenate, once diluted with oil, is removed during subsequent engine operation.

Another potential issue with biodiesels arises when trying to start an engine at low temperatures when there is a non-trivial amount of biodiesel blended in diesel fuel. Biodiesel has a greater tendency to wax. If starting is attempted with fuel, which is too waxy, the fuel injection system can be damaged.

SUMMARY

To overcome at least one problem, a diesel engine is disclosed in which an expected exhaust gas parameter based on fuel and air quantities supplied to the engine is determined; an actual gas parameter from an exhaust gas sensor signal is determined; and an amount of fuel injected into the engine is adjusted while the actual gas parameter deviates from the expected exhaust gas parameter by more than a threshold. The exhaust gas parameter is: an exhaust temperature, an air-fuel ratio, an equivalence ratio, lambda, or an exhaust gas oxygen concentration. The exhaust gas sensor signal is one of: an exhaust gas temperature sensor and an exhaust gas oxygen sensor. During each engine cycle fuel is injected in at least one fuel pulse and the amount injected for all fuel injection pulses are adjusted proportionally. E.g., at an operating condition at which there is one pilot injection in which 20% of the fuel is injected and one main injection in which 80% of the fuel is injected and the fuel quantity is increased, 20% of the increase is applied to the pilot injection and 80% applied to the main injection. However, other combustion parameters are not adjusted, combustion parameters including: turbocharger boost, exhaust gas recirculation quantity, fuel rail pressure, and start of injection for each fuel injection pulse.

A fuel compensation factor (FCF) is defined based on an amount of fuel being injected at a present level of engine output divided by an estimated amount of diesel fuel to provide the present level of engine output. In one embodiment, the FCF is determined for the present tank of fuel and is applied to all fuel injection pulses until a next refueling event. Upon a first engine start following a refueling event, the FCF is reset to one, in one embodiment, or to a base value, according to another embodiment, with the base value based on fuel compensation factor history taking into account injector drift. FCFs are stored.

In some embodiments, energizing time is adjusted to provide the desired increase or decrease in the fuel quantity. In other embodiments, the fuel injection line pressure is adjusted along with energizing time, to provide the adjustment.

According to one embodiment, fuel injection pulses to a diesel engine are adjusted upon a first engine start following fuel tank refilling when it is determined that a signal from an exhaust gas oxygen (EGO) sensor coupled to an engine exhaust deviates by more than a threshold from an expected signal level based on mass of fuel and air delivered to the engine. The adjustment to the fuel pulses are adjusted proportionally on a volumetric basis. Adjusting fuel injection pulses includes adjusting an end of injection of each fuel injection pulse while maintaining a start of injection of each fuel injection pulse constant.

A diesel engine has an EGO sensor coupled to an engine exhaust and fuel injectors coupled to engine cylinders. An electronic control unit (ECU) electronically coupled to the engine, the EGO, and fuel injectors determines a FCF based on actual exhaust gas oxygen concentration compared to expected exhaust gas oxygen concentration. A normally scheduled quantity of fuel in all fuel injection pulses by the FCF. The ECU commands a plurality of other combustion parameters according to a normally scheduled calibration and the other combustion parameters include at least EGR rate, start of injection timing, and turbocharger boost. The expected exhaust gas oxygen concentration is based on an amount of fuel and an amount of air provided to the engine and assuming that the fuel is diesel fuel. A fuel tank is coupled to fuel injectors and a fuel sensor associated with the fuel tank is electronically coupled to the ECU. The ECU resets the value of the FCF to a base value of the fuel compensation factor in response to the ECU detecting that the fuel tank has been refilled based on a signal from the fuel sensor. The ECU determines a value of the fuel compensation factor for each refill of the fuel tank, the ECU stores a plurality of determined values of the fuel compensation factor, the ECU is adapted to communicate with a scan tool, and the ECU communicates values of the fuel compensation factor that exceed a threshold value of fuel compensation factor to the scan tool.

One advantage according to one embodiment is that by applying the FCF to the injection pulses, only the fuel injection pulses are adjusted in response to the oxygenate content. Other combustion parameters are maintained constant. This greatly simplifies the calibration of the engine. Furthermore, it allows the engine to meet emission standards, while maintaining fuel economy, with minimal changes to the calibration. FCF is determined based on the EGO sensor or other exhaust sensor without knowledge of the fuel type, thereby obviating a fuel type sensor.

BRIEF DESCRIPTION OF THE DRAWINGS

FIG. 3 is a flowchart illustrating one embodiment of the disclosure; and

FIGS. 5 and 6 are graphs of the fuel compensation factor for a number of fuel tank refills;

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. The representative embodiments used in the illustrations relate generally to turbocharged four-stroke, multi-cylinder internal combustion engines. Those of ordinary skill in the art may recognize similar applications or implementations with other engine/vehicle technologies with various types of valvetrains and valve activation strategies that may include mechanical, electromechanical, and/or hydraulic systems.

Figure 1:
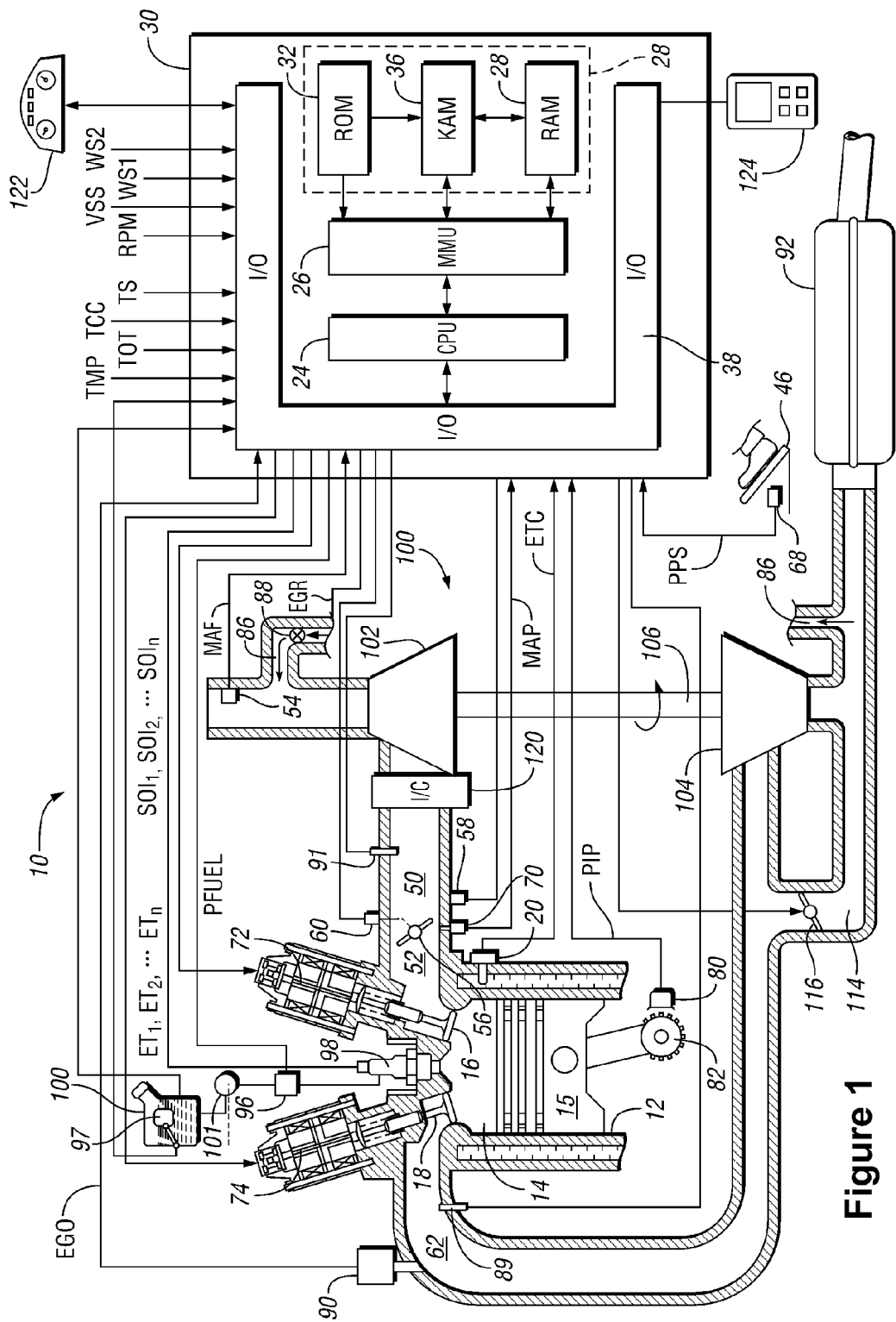
FIG. 1 is a schematic of a single cylinder of a diesel engine.

In the representative embodiment illustrated in FIG. 1, an engine system 10 includes an internal combustion engine having a plurality of cylinders, represented by cylinder 12, with corresponding combustion chambers 14 having pistons 15 reciprocating therein. As one of ordinary skill in the art will appreciate, engine system 10 includes various sensors and actuators to effect control of the engine. One or more sensors or actuators may be provided for each cylinder 12, or a single sensor or actuator may be provided for the engine. For example, each cylinder 12 may include four gas exchange valves including two intake valves 16 and two exhaust valves 18, with only one of each shown in the Figure. Alternatively, cylinder 12 may have as few as one intake valve 16 and one exhaust valve 18 or as many as desired. The engine may include only a single engine coolant temperature sensor 20. In the embodiment illustrated in FIG. 1, engine 1 includes electromagnetically or electronically-actuated intake valves 16 and exhaust valves 18 in communication with a microprocessor-based controller or electronic control unit (ECU) 30 to control valve opening and closing times. Other embodiments include alternative valve configurations and valve control using mechanical, electromechanical, hydraulic, electro-hydraulic, and/or combination valve actuation.

ECU 30 may include a microprocessor 24 or central processing unit (CPU), in communication with a memory management unit (MMU) 26. MMU 26 controls movement of data among various computer readable storage media 28 and communicates data to and from CPU 24. Computer readable storage media 28 may include volatile and nonvolatile storage in read-only memory (ROM) 32, random-access memory (RAM) 34, and keep-alive memory (KAM) 36, for example. KAM 36 is a persistent or non-volatile memory that may be used to store various operating variables while CPU 24 is powered down. Computer-readable storage media 28 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. Computer-readable storage media 28 may also include floppy disks, CD-ROMs, hard disks, and the like.

CPU 24 communicates with various engine/vehicle sensors and actuators via an input/output (I/O) interface 38. Interface 38 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of parameters, systems, and/or components that may be directly or indirectly actuated under control of CPU 24, through I/O interface 38, are fuel injection timing, rate, and duration, throttle valve position, intake/exhaust valve timing and duration, front-end accessory drive (FEAD) components such as an alternator, air conditioning compressor, and the like. Sensors communicating input through I/O interface 38 may be used to indicate turbocharger boost pressure, crankshaft position (PIP), engine rotational speed (RPM), wheel speed (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear or ratio (PRN), transmission oil temperature (TOT), transmission turbine speed (TS), torque converter clutch status (TCC), deceleration or shift mode (MDE), for example. In diesel applications, it is common for the EGO sensor to be a wide-range oxygen sensor, possibly referred to as a UEGO (universal exhaust gas oxygen) or LEGO (lean exhaust gas oxygen) sensor, rather than a standard two-level sensor commonly used in a gasoline engine. In yet another alternative, the diesel engine may use a combination NOx/wide-range O2 sensor. For the purposes of brevity, the sensor is referred to as an EGO sensor below, with the understanding such EGO sensor is any oxygen sensor, which may or may not be a heated sensor, capable of measuring oxygen concentration in a lean environment and may also be capable of measuring oxygen concentration in a rich environment.

Some controller architectures do not contain an MMU 26. If no MMU 26 is employed, CPU 24 manages data and connects directly to ROM 32, RAM 34, and KAM 36. Of course, more than one CPU 24 may be used to provide engine control and ECU 30 may contain multiple ROM 32, RAM 34, and KAM 36 coupled to MMU 26 or CPU 24 depending upon the particular application.

Engine system 10 includes an exhaust gas turbocharger having a compressor 102 mechanically coupled to a turbine 104 by a common shaft 106. An exhaust bypass passageway 114 selectively redirects exhaust flow from cylinders 12 around turbocharger turbine 104 based on position of turbine bypass valve 116, which is controlled by ECU 30 in response to at least one engine and/or ambient operating parameter.

In operation, inducted air is directed through compressor 102 of turbocharger 100 and/or bypass passage 110 depending on the position of compressor bypass valve 112. Intake air passing through compressor 102 is boosted to a pressure above atmospheric pressure with compressor 102 driven by exhaust flow through turbine 104 via shaft 106. Boosted intake airflow is cooled by passing through an intercooler (I/C) 120. Intake air from intercooler 120 and/or bypass passage 110 is distributed to the plurality of cylinders 12 via an intake manifold, indicated generally by reference numeral 52. System 10 may include a mass airflow (MAF) sensor 54, or other airflow sensor, that provides a corresponding signal to ECU 30 indicative of the intake or induction airflow. A throttle valve 56 or other airflow control device may be used to modulate the airflow and control manifold pressure within intake passage 50 to control engine torque to a desired output torque in cooperation with injection timing and quantity. Throttle valve 56 is electronically controlled by an appropriate actuator 58. A throttle position sensor 60 provides a feedback signal to ECU 30 indicative of the actual position of throttle valve 56 to implement closed loop control of throttle valve 56. An operator request for torque is determined based on a position of the accelerator pedal 46. A pedal position sensor 68 provides a signal indicative of the position of accelerator pedal 46 to ECU 30.

A manifold absolute pressure (MAP) sensor 70 is used to provide a signal indicative of the manifold pressure to ECU 30. Air passing through intake manifold 52 enters combustion chamber 14 through appropriate control of one or more intake valves 16. Timing, activation, and deactivation of intake valves 16 and exhaust valves 18 may be controlled using electromagnetic actuators 72, 74, using a conventional camshaft arrangement, using a variable camshaft timing arrangement, or using a combination thereof depending on the particular application and implementation.

Rotational position information of the crankshaft (not specifically illustrated) may be provided by a crankshaft position sensor 80 placed proximate a toothed wheel 82 coupled to the crankshaft. Crankshaft position sensor 80 may be used to generate a signal (PIP) used by ECU 30 for actuating fuel injectors to provide a desired fuel pulse width and start of injection for one or more injection events. In one embodiment, a dedicated integrated circuit chip within ECU 30 is used to condition/process the raw rotational position signal generated by position sensor 80 and outputs a signal (PIP) once per cylinder per combustion cycle, i.e. for a eight-cylinder engine, eight PIP signals per combustion cycle are generated for use by the control logic. Crankshaft position sensor 80 may also be used to determine engine rotational speed and to identify cylinder combustion based on an absolute, relative, or differential engine rotational speed.

In some embodiments, an exhaust gas temperature sensor 89 is provided in exhaust manifold 62. The sensor may be a thermocouple, thermistor, or any other suitable sensor type. Depending on the particular application, EGO sensor 90 in exhaust manifold 62 provides a signal to ECU 30 from which an exhaust air-fuel ratio, or other measures of exhaust stoichiometry, is determined. In some embodiments, an EGO sensor 91 is disposed in intake manifold 50 at a location downstream of the addition of EGR in to intake manifold 50. The exhaust gas passes through an exhaust manifold 62, one or more turbines 104, and one or more exhaust aftertreatment devices 92 before being exhausted to atmosphere. Alternatively, and/or additionally, EGO sensors may be located after turbine 104 and upstream and/or downstream aftertreatment devices 92.

Fuel is supplied to fuel injectors 98 (only one shown in FIG. 1) from tank 100 via one or more fuel pumps 101. In diesel applications, it is common to have a lift pump supplying the fuel to a high pressure pump to obtain the very high injection pressures desired (pumps not individually shown). Common rail systems have a fuel rail (not shown in FIG. 1 as only one cylinder is illustrated) between the fuel pump and the injectors. The fuel rail dampens pressure pulses induced by the pump and those induced by the opening/closing of other injectors coupled to the fuel rail. The fuel rail dampening helps to even out the pressure to the injectors and provide better control as to the amount of fuel injected into the cylinders. Fuel injectors 98 inject a metered quantity of fuel in one or more injection events as commanded by ECU 30. The quantity of fuel supplied can be estimated based on the fuel pulse width of the injection(s), the pressure in the fuel supply line, which is measured by a fuel pressure sensor 96, and characteristics of fuel injector 98, e.g., number and size of orifices. The signal from fuel pressure sensor 96 is provided to ECU 30.

In the embodiment shown in FIG. 1, a fuel sensor 97 is provided in fuel tank 100. Based on the level of fuel in tank 100, as determined by sensor 97, it can be determined whether tank 100 has been refueled. In alternative embodiment, a door (not shown) is provided proximate tank 100. A door sensor is provided. When it is detected that the door has been opened, it is assumed that the tank has been refueled.

An important factor in controlling NOx production is providing an appropriate amount of exhaust gases into the engine intake. An exhaust gas recirculation (EGR) system is provided to conduct exhaust gases from the engine exhaust to the engine intake through an EGR duct 86. In FIG. 1, only two portions of EGR duct 86 are shown, one portion connected to the engine exhaust located downstream of turbine 104 and one portion connected to the engine intake located upstream of compressor 102. An EGR valve 88 disposed in EGR duct 86 controls EGR flow. To keep the combustion temperatures down so that NOx generation is reduced, it is common to provide an EGR cooler controlled by an EGR cooler bypass valve (not shown in FIG. 1). In alternative embodiment, EGR is taken from the exhaust at a location upstream of turbine 104 and provided into the intake at a location downstream of compressor 102. EGR valve 88 position is commanded by ECU 30. In yet another alternative, two EGR paths with EGR collected both upstream and downstream of turbine 104 and returned downstream and upstream of compressor 102, respectively. Under certain operation conditions, throttle valve 56 is partially closed to provide an intake depression to cause exhaust gas to flow from the exhaust to the intake. In some embodiments, an additional throttle (not shown) is provided upstream of the compressor to cause exhaust gas to flow from the exhaust to the intake. Or, an exhaust throttle (not shown) can be partially closed to drive the flow from exhaust to the intake.

Continuing to refer to FIG. 1, a vehicle display 122 is coupled to ECU 30. Vehicle display 120 can include a vehicle speed gauge, a fuel level gauge, a fuel economy indicator, warning indicators and/or user input buttons. ECU 30 can be coupled to a scan tool 124 by a service technician. As well be described below, fuel having more than a recommended amount of oxygenate can be provided in tank 100. The maximum level of FCF encountered or an estimate of the amount of oxygenate can be downloaded to the scan tool. Such information can be useful in diagnosing service issues that may arise.

Figure 2:
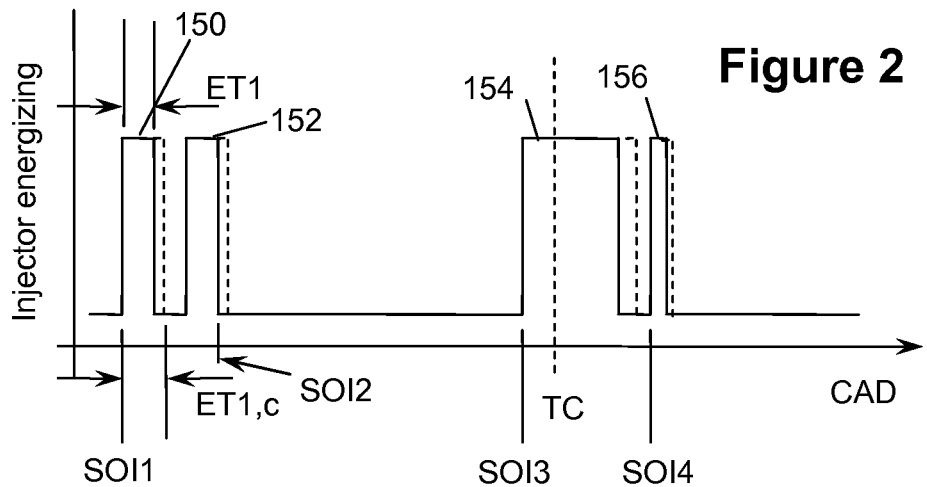
FIGS. 2, 7, and 8 are time lines illustrating multiple fuel injection pulses for a single engine cycle.

A time line of multiple injection events during one engine cycle in one cylinder is shown in FIG. 2. The example shown in FIG. 2 shows two pilot injection pulses 150, 152, a main injection pulse 154, and a post injection pulse 156. One or more pilot injections are often provided to control emissions and combustion noise. One or more post injections can condition the exhaust gases so that the aftertreatment device(s) operate at high efficiency or to control particulate emissions. The solid line in FIG. 2, illustrates a baseline set of injection pulses, according to one example, i.e., for a particular engine operation condition combusting diesel fuel. The amount of fuel injected in each injection interval is related to the duration of the energizing time (ET) commanded to the injector, ET1, ET2, ET3, and ET4. Fuel injection quantity is increased in response to an oxygenated fuel. According to an embodiment of the disclosure, fuel injection quantity is increased proportionally. For example, if 10 mg is injected in a first pulse and 20 mg is injected in a second pulse and the fuel increase as a result of an oxygenated fuel blend substituted for diesel fuel is 5%, then ET of the first pulse is increased so that 10.5 mg is injected and ET of the second pulse is increased so that 21 mg is injected. Such increase in ETs is shown as a dotted line in FIG. 2. According to another embodiment of the disclosure, the start of injection (SOI) of each of the pulses (SOI1, SOI2, SOI3, and SOI4) remains constant with the lengthening of the pulses occurring by delaying the end of injection, with the compensated ETs shown as ET1_c, ET2_c, ET3_c, and ET4_c in FIG. 2. The increase in fuel injected in each of the injection pulses can be accomplished solely by increasing the ETs. In an alternative embodiment, the fuel pressure on the upstream side of the fuel injector can be increased so that the ETs are nearly constant even with an oxygenated fuel. In yet another alternative, a combination of increased ET and increased fuel pressure can be employed.

A flowchart according to an embodiment of the disclosure is shown in FIG. 3. Upon engine starting in 170, it is determined whether it is the first engine start since a refueling event in block 172. The refueling can be determined via a fuel gauge sensor, an opening of the fuel cap on the fuel tank, or in any suitable manner. If so, control passes to 174 in which a fuel compensation factor (FCF) is set to 1.0, which is appropriate level for diesel fuel. FCF is equal to the mass of fuel after compensation divided by the expected mass of fuel, if the fuel is 100% diesel fuel. All other engine combustion parameters, such as EGR rate and start of injection timings, are set according to the present engine speed and driver demand as determined based on an accelerator pedal position. If a negative result in block 172, control passes to block 176 in which it is determined whether a FCF factor has previously determined for the present tank of fuel. If a positive result in block 176, control passes to block 178 in which the determined FCF is used for the remainder of the present tank of fuel. That is, FCF is not changed further until the tank is refilled. If instead, a negative result in block 176, control passes to block 180 to determine if the actual EGO sensor signal equals the expected EGO sensor signal. If not, control passes to block 182 to adjust the injector ETs and/or fuel pressure so that the actual EGO signal approaches the expected signal. Decision block 180 is also entered based on a negative result in block 176, i.e., when a FCF for the tank has not yet been determined. Furthermore, decision block 180 is also accessed from block 174. In block 174, FCF is completely unknown for the new tank of fuel. FCF of 1.0 (or a base value) is set and learning the new FCF is accomplished in blocks 180 and 182. Once it has been determined that the actual EGO sensor signal is sufficiently close to the expected EGO sensor (within a predetermined tolerance), control passes from block 180 to block 184 in which an FCF is determined for the present tank of fuel. This FCF is applied for the remainder of the tank of fuel.

In FIG. 3, the determination of FCF in block 184 appears as a result of a single positive occurrence in block 180. However, for the purposes of improving accuracy, the comparison between actual and expected EGO signal in blocks 180 can be performed repeatedly over a range of operating conditions. Thus, although a single positive result in 180 is shown in FIG. 3 to cause the determination of FCF, multiple determinations of FCF over a range of engine operating conditions can be made with the resulting FCF based on the multiple measures of FCF, an embodiment also within the scope of the present disclosure.

An advantage in adjusting the fuel according to an embodiment of the disclosure to compensate for oxygenated fuel is that only the ETs need be adjusted. The other engine calibration parameters remain the same. This approach is much less complicated than determining complete calibrations of engine coefficients for multiple types of oxygenates and as a function of the fraction of oxygenate blended into diesel fuel. Furthermore, such an approach depends on determining the type of oxygenate in the fuel.

Figure 4:
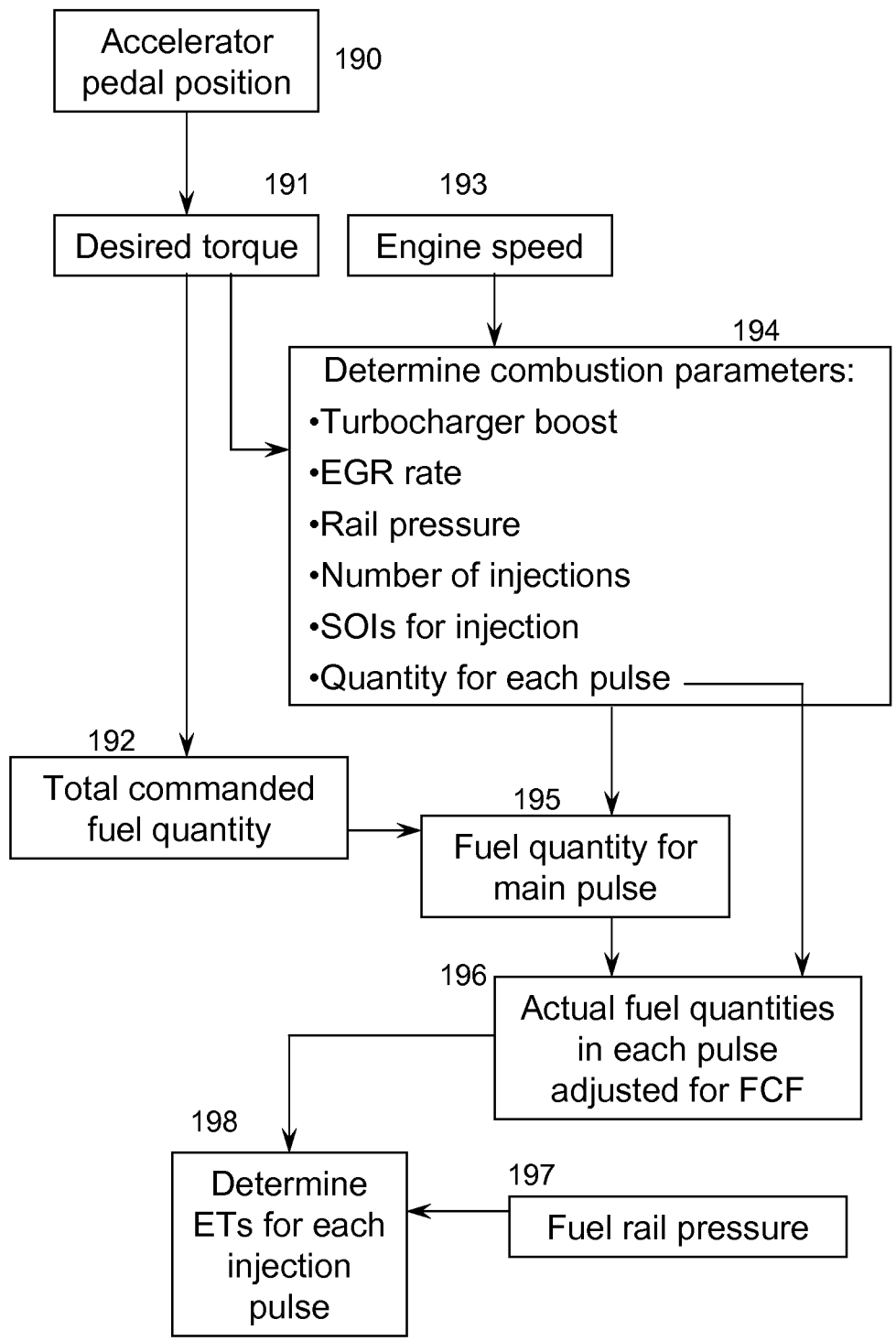
FIG. 4 is a high level control strategy according to one embodiment of the disclosure.

A simplified control strategy is shown in FIG. 4. Accelerator pedal position, in 190, is used in block 191 to determine an operator desired torque. The amount of fuel that is required to provide such torque is determined in 192. The assumption in 192 is that the fuel is diesel fuel. In block 194, combustion parameters are determined as a function of the desired torque determined in 191 and the current engine speed 193. Such combustion parameters may include EGR rate, fuel rail pressure, turbocharger boost, the number of injections (number of pilot and post injection in addition to the main injection), start of injection (SOI) timings for each of the injections, and the quantity of fuel in each fuel injection pulse, other than the main injection, e.g., the pilot(s). Based on the total commanded fuel, the fuel quantity for the main pulse is determined in block 195 by taking the total commanded fuel quantity and subtracting off the quantities for the injection pulses other than the main pulse. Actual fuel quantities in each pulse are adjusted for the FCF in 196. Such adjustment based on FCF corresponds to when an FCF has already been determined for the present tank of fuel. If no FCF has been determined, a learning process is commanded instead. Current fuel rail pressure impacts the ETs that should be commanded to the injector to provide the desired quantity. Thus, fuel rail pressure 197, is input to block 198, along with the actual fuel quantities of block 196. In block 198, the ETs for each injection pulse is determined.

In the above discussion, the term fuel quantity is determined. FCF is defined above in terms of fuel mass. It is desirable to control fuel on a mass basis. However, injectors provide fuel on a volumetric basis. In some embodiments, fuel density is unknown. The assumption is made that fuel density is constant, i.e., not dependent on fuel type. Such an assumption introduces a very small error because the density of diesel fuel and typical oxygenates vary minimally from each other. Thus, in such embodiments without a measure of fuel density, fuel is controlled on a volumetric basis. Thus, FCF based on a mass ratio is equal to FCF determined based on a volume ratio of actual to expected. In embodiments in which density is determined, appropriate corrections can be introduced. Although the volume of fuel injected is generally linearly related to the ET, there is an offset due to injector dynamics. The injector characteristics are known and the volume of fuel injected is determined based on ET and the fuel rail pressure. Conversely, the ET can be determined based on the volume of fuel desired and the fuel rail pressure.

In FIG. 5, an example of FCF as a function of the number of fuel tank fillings is shown, with the initial value at 1.0. The injector characteristics are known to drift due to breaking in the injector, injector deposits slightly impeding the flow through the injector, injector valve seat wear, and piezo stack aging. FCF6, the FCF of the sixth tank of fuel, is about 1.04 and sufficiently dissimilar from earlier FCF values indicating that the sixth tank of fuel contains some oxygenate. FCF7 for the subsequent tank filling also has some oxygenate as the additional fuel mixes with the remainder of the fuel left from fuel tank six. For tanks 13 through 18, the fuel injector is drifting to have a FCF just higher than one. FCF19 is particularly high, indicating that possibly more oxygenated fuel is in the fuel blend than is recommended for the engine. Nevertheless, FCF19 causes the adjustment to be appropriate for the fuel in the nineteeth tank. Tank refills 28 and 29 indicate use of an oxygenate and tank refill 30 has a FCF indicating a higher level of oxygenated fuel than recommended. In one embodiment, the FCF determined for each tank is stored in memory so that the trend in FCF can be determined, such as curve 200. FCF6 and FCF7 deviate from the trend curve 200 more than can be explained by normal injector drift. In one embodiment, FCF used to make adjustments to the fuel injection duration is set to the approximate value of the trend curve 200, called base FCF. For example, the base FCF value is about 1.01 for tank 20. Alternatively, the base FCF is set at 1.00 without making drift adjustments to follow the trend from the historical data of FCF. In one alternative, FCFs for all tanks are stored in memory. In another embodiment, only a subset of the values are retained, e.g., a base FCF value and a maximum FCF value.

In one embodiment, FCFs indicating that the maximum oxygenate quantity in the fuel has been exceeded is stored in memory. Referring to FIG. 4, the value of FCF in tanks 19 and 30 exceed the recommended maximum value of FCF. In one embodiment, a warning message can be provided to the vehicle operator to indicate that the fuel in the tank exceeds the recommended maximum concentration of oxygenate. An estimate of the fraction of oxygenate in the fuel blend can be based on FCF. An implicit assumption is the type of oxygenate that is used. Based on that assumption a correlation between fraction of oxygenate and the FCF can be used to provide the estimate of oxygenate fraction in the fuel blend. If the type of oxygenate being used is known, by, for example, a smart filling pump that communicates the information to the ECU or by a fuel sensor, then the relationship between FCF and % oxygenate for the particular oxygenate can be used instead. An inappropriately high level of oxygenate can be determined and tracked to assist in service operations to diagnose issues. Such information could also be broadcast to a manufacturer's central database to track vehicles that have exceeded the limit to determine if there is a source of fuel that is leading to warranty issues.

In FIG. 6, another example of FCF as a function of the number of fills is shown in more detail. A brand new engine is assumed to be fueled with diesel fuel at the factory and FCF is set to 1.0. In the example in FIG. 6, tanks 2 and 3 are also filled with diesel fuel. FCF is set to 1.0 initially. Due to injector break in or other factors, the injectors drift and FCF adjust slightly from 1.0 until a FCF for the tank is determined and the FCF is constant thereafter, until the tank is refilled. The 3rd refill (4th tank) contains an oxygenate. FCF is set immediately to 1.0, even though the FCF of the prior tank was slightly greater than 1.0. It is immediately determined that the expected and actual EGR sensor reading diverge. Thus, the FCF increases rapidly to cause the two to equal. After a period of adjustment an FCF for tank 4 is determined and remains constant for the remainder of the tank. Tank 5 is diesel fuel, but mixes with the oxygenate remaining at from the previous tank. FCF upon the 4th refill is set to 1.0 initially and adjusts to the determined FCF after a learning period. Alternatively, FCF can be reset upon a tank refill to a base value for FCF as determined based on the trend (such as demonstrated in FIG. 5).

Figure 7:
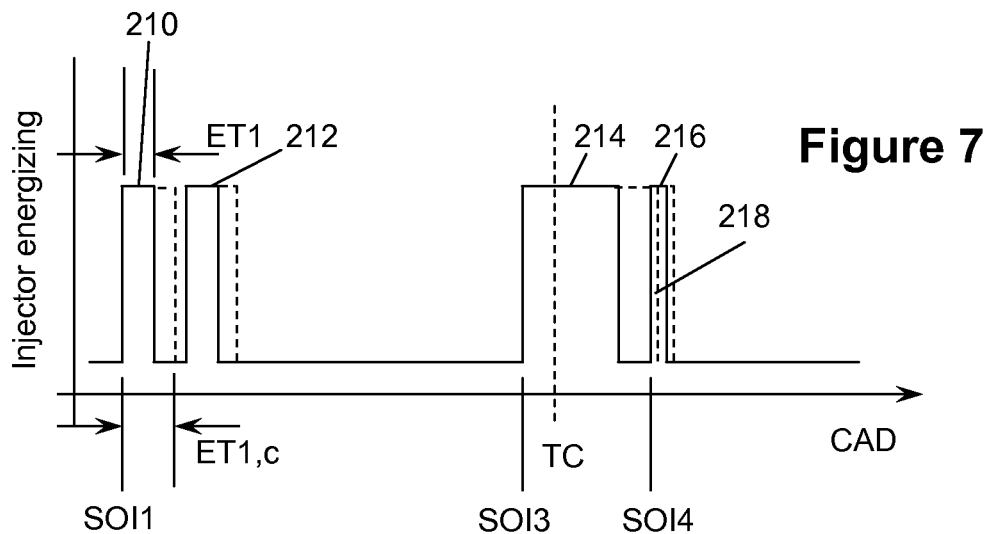
Figure 8:
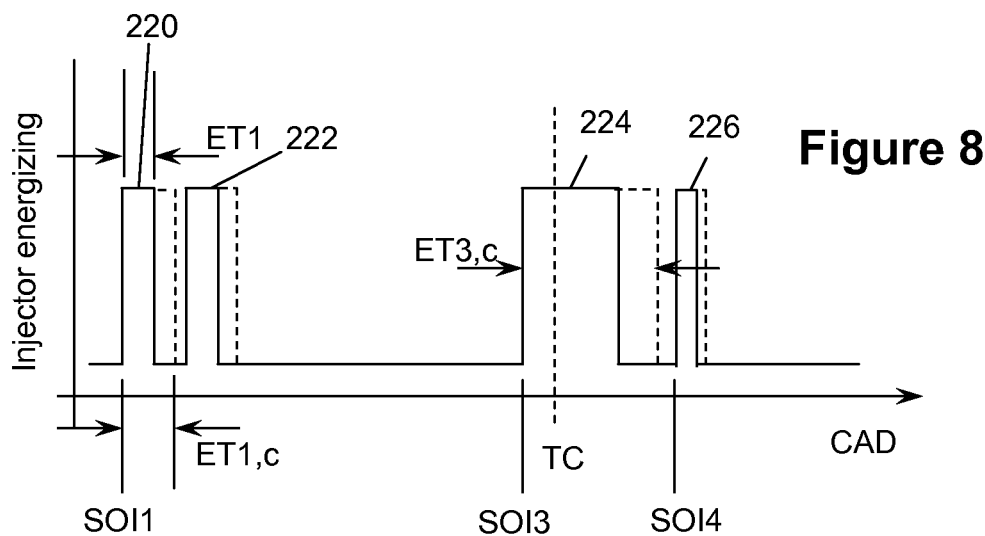

Referring to FIG. 7, an example with a high level of oxygenate is shown in which the ETs 210, 212, 214, and 216 are lengthened considerably. ET 214 overlaps with 216, as shown by overlap 218. In FIG. 6, one embodiment of the disclosure is shown in which the start of injection is delayed only for injection pulses which would overlap a prior injection. For the example shown in FIG. 5, the fourth injection pulse 226 is set to occur, if start of injection is maintained constant, prior to the end of the third injection pulse 224. In this case, the fourth injection 226 is commanded to start after a minimum delay period 218 after the end of the injection of the third injection pulse 224. The minimum delay period may be a hardware limitation of the injector. One alternative is to maintain the same dwell between injection pulses.

Figure 9:
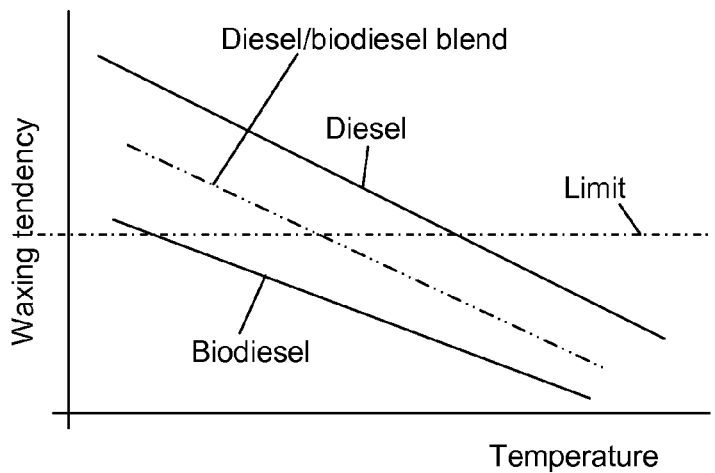
FIG. 9 is a graph of waxing tendency as a function of temperature for diesel, oxygenate and a diesel/oxygenate blend.

Diesel and biodiesel fuels become waxy at sufficiently low ambient temperatures. One type of oxygenate, biodiesel have a much greater tendency to congeal or form precipitates. If an engine start is attempted when the fuel is too congealed, the fuel injection system can be damaged. In FIG. 9, the waxing tendency is plotted as a function of temperature for diesel fuel, biodiesel, and one example of a blend, around a 50/50 blend. Diesel fuel waxes at extremely low temperatures, but does not suffer such tendency at most temperatures. Pure biodiesel, however, waxes at temperatures that may be commonly encountered. Thus, 100% biodiesel, without an auxiliary fuel heater, should be avoided in certain climates. Fuels with more than a particular level of biodiesel content can also cause problems. FCF can be used to estimate the amount of biodiesel in the fuel to detect a potential waxing problem.

Figure 10:
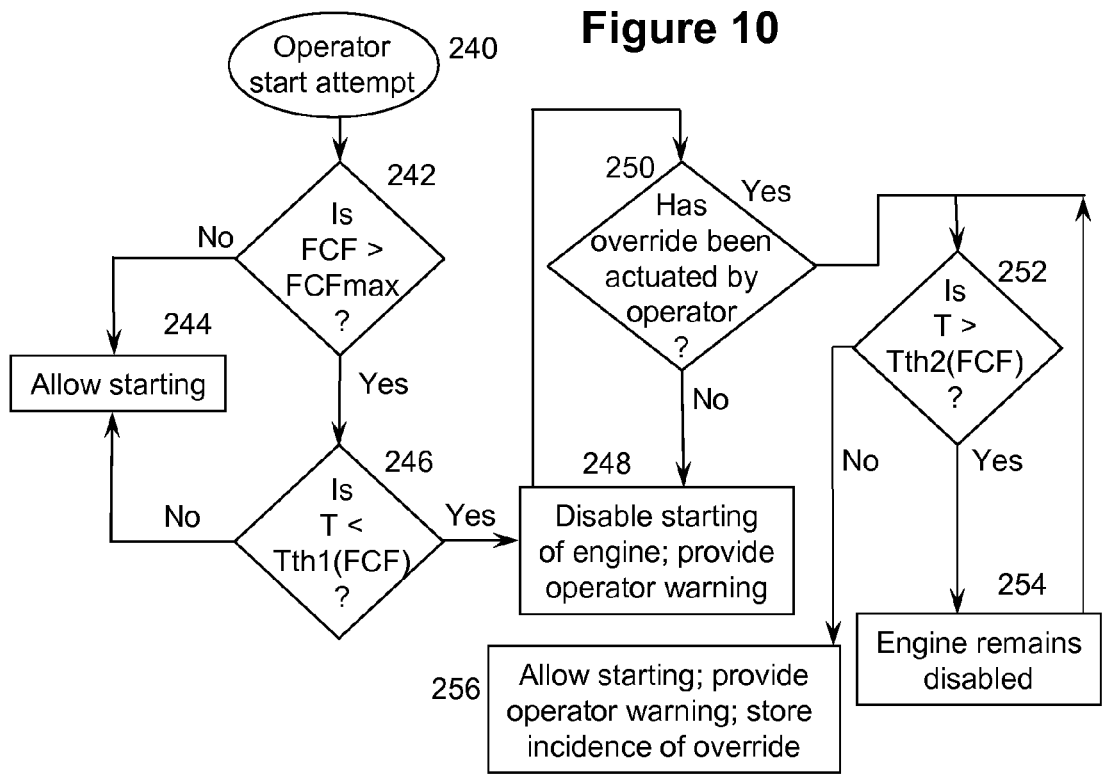
FIG. 10 is a flowchart illustrating an engine starting strategy.

In FIG. 10, an algorithm to prevent damage to the fuel system is shown. When vehicle operator attempts to start the vehicle 240, control passes to decision block 242 in which it is determined whether FCF is greater than a threshold FCF. FCF provides an estimate of the amount of biodiesel in the blend and thus, an indication of the waxing tendency. If FCF, as previously determined, is less than a threshold FCF, engine starting is allowed in block 244. If FCF is greater than the threshold, control passes to block 246 in which temperature in the fuel system is compared to a temperature at which the waxing tendency is too great, first threshold temperature, Tth1. The first threshold temperature, in the embodiment in FIG. 10, is a function of FCF. In an alternative embodiment, the waxing temperature is set to a constant, i.e., not a function of FCF. If fuel system temperature is higher than the first threshold temperature, the engine is allowed to start in block 244. If fuel system temperature is lower than the first threshold temperature, engine starting is prevented in block 248 and the operator is provided with a warning message, light, oral message, lighted dash symbol, and/or beeping alarm. According to the embodiment in FIG. 10, the operator may choose to override the warning and risk damage to the fuel injection system, by pressing a button on the dash or other input. In one embodiment, the override asks for acknowledgement from the operator to indicate what is at risk by actuating the override. Control passes to block 250 where it is determined whether the operator has actuated the override. If not, control returns to block 248 and maintains the status quo of the engine being disabled. If an override is detected, control passes to decision block 252 in which the fuel system temperature is compared to a second threshold temperature, with the second threshold temperature being a function of FCF. The second threshold temperature is always lower than the first threshold temperature. If the fuel system temperature is not lower than the second threshold temperature: starting is attempted, the operator may be once again warned of the consequences, and the incidence of an override condition may be stored for diagnosis efforts by a scan tool. That is, such information may be useful in diagnosing a fuel system problem. If the fuel system temperature is lower than the second threshold temperature, the engine remains disabled until the fuel system temperature does attain the necessary temperature to provide a negative result in decision block 252. Possibly, the engine restart is attempted later in the day when ambient temperatures are higher. Or, the operator may take measures to warm up the fuel system, such as operation of an appropriate heater or by pushing or towing the vehicle to a heated garage. The two threshold temperatures are roughly: a temperature at which damage to the fuel system could be occurring (first threshold) and a temperature at which damage to the fuel system is nearly certain to occur (second threshold). It is normally undesirable to disable the engine. However, in the case of temperatures below the second threshold, the engine would be disabled anyway due to the high level of wax in the fuel with the additional disadvantage of the fuel system being damaged. Having the vehicle disabled prior to causing damage to the injection system is preferred. At temperatures between the first and second thresholds, there is uncertainty as to whether damage will occur. There are uncertainty and measurement inaccuracies in determining FCF. Then, based on an assumption as to the type of oxygenate that is blended in the diesel fuel, a biodiesel content is estimated. Thus, at temperatures between the thresholds, the operator is allowed to take a chance of damaging the fuel system in the event that the operator is in a position in which being unable to start the engine presents a greater negative consequence than the potential for fuel system damage.

Fuel system temperature can be measured directly, estimated based on other temperature, such as engine coolant temperature and a heat transfer model of how the fuel system temperature corresponds to engine coolant temperature, or estimated using other suitable models.

The algorithm in FIG. 10 only works when a FCF for a tank in which too much biodiesel has been added has also had an opportunity to operate long enough to determine FCF. Typically, fuel is added to a vehicle which has been previously warmed up. Thus, in one scenario, the vehicle is refueled when the engine is fully warmed and then restarted immediately thereafter. The deleterious effect of too much biodiesel waxing in the fuel system is not realized because the biodiesel is pumped into a fuel system that is warm and that continues to receive radiant energy from a warmed up engine. However, in the process of running a fuel with an inappropriately high biodiesel content, the FCF of the tank is discerned. So, at a next engine start, which may be, for example, a cold morning with an engine system that is at the ambient temperature, the knowledge of the FCF for the tank is used to prevent starting of the engine to thereby prevent fuel system damage.

Oil dilution is affected by the amount of oxygenated fuel provided to the engine due to the volatility characteristics of typical oxygenated fuels. Some engine controllers estimate the level of oil dilution with post-injections contributing to increasing dilution of the oil by fuel and high temperature operation of the engine leading to vaporization of more volatile fuel components from the oil. Oil dilution estimation is used to provide an estimate of when the oil should be changed. By using FCF as an indicator of the amount of oxygenate being used, the estimate of fuel dilution is improved and thus the estimate of when the oil should be changed is improved.

Oxygenates generate a lower level of particulate matter than diesel fuel. Thus, a diesel particulate filter, which may be one of the aftertreatment devices 92 of FIG. 1, becomes loaded less quickly the more oxygenate that is used. Typically, carbonaceous particulate matter collected in the diesel particulate filter is periodically combusted in a regeneration event. It is desirable to perform regenerations as infrequently as possible because they lead to a reduction in fuel economy. Furthermore, the regeneration is more effective when performed on a full, but not too full, filter. Accuracy of the estimation of the amount of soot in the diesel particulate filter can be improved by estimating the amount of oxygenate combusted in the engine based on the FCF. The improved accuracy allows for delaying regenerations until the diesel particulate filter is properly full.

The energy content of oxygenates is less than that of diesel fuel due to the oxygen content of oxygenate. In vehicles supplied with a fuel economy readout, such as in miles per gallon (mpg), the operator of the vehicle may interpret a lower readout in mpg when oxygenate is used as indicating a problem with the vehicle rather than a consequence of using a fuel with a lower energy content. To at least partially address this issue, according to one embodiment of the disclosure, an effective mpg is displayed instead of the actual mpg. An effective mpg corrects for the lower energy content of the fuel so that the mpg readout can be interpreted as being determined by driving cycle, driver habits, and ambient conditions rather than fuel choice. The effective mpg is actual mpg divided by FCF. If FCF is adjusted to account for injector drift, the amount of the adjustment to compensate for injector drift is removed from FCF. Thus, in such embodiment, FCF used in the calculation for effective mpg is a determined FCF less the base value of FCF. In embodiments where the FCF base value remains at one, no such adjustment is performed.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. For example, it may be desirable to have an extensive set of sensors to provide an accurate assessment of the state of vehicle accessories. However, to maintain a desirable cost structure, a satisfactory estimation of some accessory quantities may be ascertained by inferring from a lesser set of sensor data. The embodiments described as being less desirable relative to other embodiments with respect to one or more characteristics are not outside the scope of the disclosure as claimed.

What is claimed:

1. A method to operate an internal combustion engine, comprising:
   determining a fuel compensation factor based on a current EGO sensor signal relative to an expected EGO sensor signal for a known fuel based on fuel and air quantities supplied to the engine, where the fuel compensation factor is an amount of fuel being injected at a present level of engine output divided by an estimated amount of diesel fuel to provide the present level of engine output; and
   adjusting an amount of fuel injected into the engine based on the fuel compensation factor by adjusting an end-of-injection timing while maintaining a start-of-injection timing for at least one fuel injection pulse.

2. The method of claim 1 wherein:
   adjusting the amount of fuel injected comprises delaying the end-of-injection timing thereby increasing a duration of energizing time for the at least one fuel pulse such that the amount of fuel injected increases proportionally based on the fuel compensation factor, and
   adjusting combustion parameters other than fuel injection based on a normally scheduled calibration responsive to operator desired torque and not in response to the current EGO sensor signal relative to the expected EGO sensor signal.

3. The method of claim 1 wherein:
   adjusting the amount of fuel injected comprises adjusting the amount of fuel injected in a plurality of fuel injection pulses by delaying the end-of-injection timing thereby increasing a duration of energizing time for each fuel injection pulse proportionally.

4. The method of claim 3, further comprising:
   applying the fuel compensation factor to all fuel injection pulses until a next refueling event; and
   applying a base value of the fuel compensation factor in response to a first engine start following a refueling event.

5. The method of claim 3 wherein adjusting the amount of fuel injected comprises applying a minimum delay period after each of the fuel injection pulses.

6. A method, comprising:
   detecting fuel tank refilling; and
   adjusting each fuel injection pulse in response to:
      a first engine start following the fuel tank refilling; and
      a fuel compensation factor based on a signal from an EGO sensor deviating by more than a threshold from an expected signal level based on mass of fuel and air delivered to an engine,
   wherein adjusting the fuel injection pulse comprises maintaining a start-of-injection timing while delaying an end-of-injection timing thereby increasing a duration of energizing time for the at least one fuel pulse such that an amount of fuel injected increases proportionally based on the fuel compensation factor; and
   not adjusting a turbocharger boost amount in response to the EGO sensor deviating by more than a threshold from the expected signal level.

7. The method of claim 6 wherein a volume of fuel injected during each fuel injection pulse is adjusted proportionally.

8. The method of claim 7, further comprising:
   determining a value for a fuel compensation factor for each tank refill, the fuel compensation factor based on an amount of fuel being injected at a present level of engine output divided by an estimated amount of diesel fuel to provide the present level of engine output; and
   storing values of the fuel compensation factor in an electronic control unit coupled to the engine.

9. The method of claim 6, further comprising:
   determining a fuel compensation factor base value based on fuel compensation factor history, the fuel compensation factor base value substantially accounting for drift in fuel injectors coupled to engine cylinders; and
   applying the fuel compensation factor value of one in response to a first engine start following tank refilling.

10. An engine system, comprising:
    an EGO sensor coupled to an engine exhaust;
    fuel injectors coupled to engine cylinders; and
    an ECU electronically coupled to the engine, the EGO, and fuel injectors, the ECU determining a fuel compensation factor based on actual exhaust gas oxygen concentration compared to expected exhaust gas oxygen concentration and adjusting a scheduled quantity of fuel in all fuel injection pulses by the fuel compensation factor by maintaining a start-of-injection timing while delaying an end-of-injection timing thereby increasing a duration of energizing time for at least one fuel pulse such that an amount of fuel injected increases proportionally based on the fuel compensation factor, the ECU not adjusting a turbocharger boost amount in response to the EGO sensor deviating by more than a threshold from an expected signal level.

11. The system of claim 10, further comprising:
a fuel tank coupled to the fuel injectors; and
a fuel sensor associated with the fuel tank, the sensor being electronically coupled to the ECU wherein the ECU resets a value of the fuel compensation factor to a base value of the fuel compensation factor in response to the ECU detecting that the fuel tank has been refilled based on a signal from the fuel sensor.

12. The system of claim 11, wherein the ECU determines a value of the fuel compensation factor for each refill of the fuel tank, the ECU stores a plurality of determined values of the fuel compensation factor, the ECU is adapted to communicate with a scan tool, and the ECU communicates values of the fuel compensation factor that exceed a threshold value of fuel compensation factor to the scan tool, and where the fuel compensation factor based on an amount of fuel being injected at a present level of engine output divided by an estimated amount of diesel fuel to provide the present level of engine output.

13. The method of claim 1 further comprising inhibiting the engine from starting if a fuel system temperature is below a first threshold temperature associated with a current fuel compensation factor.

14. The method of claim 13 further comprising:
allowing an engine start in response to an operator override only if the fuel system temperature is above a second threshold temperature less than the first threshold temperature.

15. The method of claim 6 wherein adjusting the amount of fuel injected comprises applying a minimum delay period after each fuel injection pulse.

16. The system of claim 10 wherein the ECU applies a minimum delay period after each fuel injection pulse.

17. The method of claim 2, where the other combustion parameters include turbocharger boost and fuel rail pressure.

18. The method of claim 2, where the other combustion parameters include exhaust gas recirculation quantity.

* * * * *

UNITED STATES PATENT AND TRADEMARK OFFICE
CERTIFICATE OF CORRECTION

| | | |
|---|---|---|
| PATENT NO. | : 8,442,744 B2 | Page 1 of 1 |
| APPLICATION NO. | : 12/839674 | |
| DATED | : May 14, 2013 | |
| INVENTOR(S) | : Eric Kurtz et al. | |

It is certified that error appears in the above-identified patent and that said Letters Patent is hereby corrected as shown below:

Title Page

(75)   Inventors:

Delete the name of the third inventor "Jianwen James Wi" and
Insert -- Jianwen James Yi --

Signed and Sealed this
Fifth Day of August, 2014

Michelle K. Lee
*Deputy Director of the United States Patent and Trademark Office*